United States Patent
Bin-Nun

(10) Patent No.: US 11,112,797 B2
(45) Date of Patent: Sep. 7, 2021

(54) SYSTEM AND METHOD FOR IMPROVING AUTONOMOUS VEHICLE SAFETY PERFORMANCE

(71) Applicant: Amitai Yisrael Bin-Nun, Washington, DC (US)

(72) Inventor: Amitai Yisrael Bin-Nun, Washington, DC (US)

(*) Notice: Subject to any disclaimer, the term of this patent is extended or adjusted under 35 U.S.C. 154(b) by 146 days.

(21) Appl. No.: 16/197,506

(22) Filed: Nov. 21, 2018

(65) Prior Publication Data

US 2019/0163185 A1    May 30, 2019

Related U.S. Application Data

(60) Provisional application No. 62/592,409, filed on Nov. 30, 2017.

(51) Int. Cl.
| | |
|---|---|
| *G05D 1/00* | (2006.01) |
| *B60W 50/04* | (2006.01) |
| *B60W 40/09* | (2012.01) |
| *G07C 5/08* | (2006.01) |
| *G07C 5/00* | (2006.01) |

(52) U.S. Cl.
CPC .......... *G05D 1/0088* (2013.01); *B60W 40/09* (2013.01); *B60W 50/045* (2013.01); *G07C 5/008* (2013.01); *G07C 5/085* (2013.01); *B60W 2552/00* (2020.02); *B60W 2555/20* (2020.02); *G05D 2201/0213* (2013.01)

(58) Field of Classification Search
CPC ........ G05D 1/0088; G05D 2201/0213; B60W 40/09; B60W 50/045; B60W 2552/00; B60W 2555/20; G07C 5/008; G07C 5/085

See application file for complete search history.

(56) References Cited

U.S. PATENT DOCUMENTS

| | | | |
|---|---|---|---|
| 2014/0163805 A1* | 6/2014 | Braunstein | E02F 9/265 701/23 |
| 2018/0074501 A1* | 3/2018 | Boniske | B60W 50/04 |

* cited by examiner

*Primary Examiner* — Tyler J Lee
*Assistant Examiner* — Yufeng Zhang

(57) ABSTRACT

A method for evaluating safety performance of an autonomous vehicle including comparing first sensor data characterizing a driver-operation of a vehicle to a first threshold to obtain a first driving quality value, comparing second sensor data characterizing an autonomous-vehicle-operation to a second threshold to obtain a second driving quality value, and determining, based at least in part on a comparing of the first and second driving quality values to each other, a safety performance of the autonomous-operated vehicle relative to the driver-operated vehicle, and a corresponding system.

18 Claims, 3 Drawing Sheets

SYSTEM AND METHOD FOR IMPROVING AUTONOMOUS VEHICLE SAFETY PERFORMANCE

CROSS-REFERENCE TO RELATED APPLICATIONS

This application claims the benefit of priority of U.S. Provisional Patent Application No. 62/592,409 filed Nov. 30, 2017, which is hereby incorporated by reference in its entirety.

FIELD OF THE INVENTION

This invention relates to systems and methods for testing the safety of autonomous vehicles (AVs) and/or to assessing and operationalizing autonomous vehicle safety performance relative to human drivers under similar conditions.

BACKGROUND TO THE INVENTION

In an effort to test the safety of autonomous vehicles (AVs), the vehicles are often driven for thousands or even millions of miles, and an accounting is then made of the number of accidents or near-accidents for which the AV was involved. However, there are numerous issues with this approach, the least of which is that severe crashes are relatively rare, so it is hard to validate the safety of AVs through a reasonable number of miles test-driven on the road.

Another approach taken is simulating an AV driving a virtual world or testing vehicles in a controlled test track environment. However, a simulated mile is different from a real-world mile, and it is difficult to reproduce all real-world scenarios, or to know with certainty that AV performance in a simulator or test track environment translates with high fidelity to performance in the real world.

SUMMARY OF THE INVENTION

The present disclosure may relate to at least one of the above. However, the present disclosure may also prove useful to other technical areas. Therefore, the disclosure should not be construed as necessarily limited to addressing any of the above.

Accordingly, in a non-limiting embodiment of the present invention, a method for evaluating safety performance of an autonomous vehicle is provided, the method comprising the steps of comparing first sensor data characterizing a driver-operation of a vehicle to a first threshold to obtain a first driving quality value, comparing second sensor data characterizing an autonomous-vehicle-operation to a second threshold to obtain a second driving quality value, and determining, based at least in part on a comparing of the first and second driving quality values to each other, a safety performance of the autonomous-operated vehicle relative to the driver-operated vehicle.

In an alternative non-limiting embodiment of the invention, the method further comprises the steps of, prior to determining the safety performance: calculating a degree of similarity between at least one first condition that is external to the driver-operated vehicle and at least one second condition that is external to the autonomous-operated vehicle, determining that the degree of similarity exceeds a threshold, and comparing the first and second driving quality values to each other based at least in part on the determination that the degree of similarity exceeds the threshold.

In an alternative non-limiting embodiment of the invention, the at least one first and second conditions include at least one of a weather condition, a lighting condition, a road condition, a road boundary condition, or an operational condition.

In an alternative non-limiting embodiment of the invention, the first and second thresholds are different.

In an alternative non-limiting embodiment of the invention, the method further comprises the steps of creating at least one arbitrary operational design domain ("ODD") based on at least one condition that is external to the driver-operated vehicle, and determining a driver-operated vehicle performance within the at least one operational design domain.

In an alternative non-limiting embodiment of the invention, the method further comprises the steps of determining an autonomous-operated vehicle performance within the at least one operational design domain, comparing the driver-operated vehicle performance to the autonomous-operated vehicle performance within the at least one operational design domain, and determining, based at least in part on the comparing, whether it is safer for the autonomous-operated vehicle or the driver-operated vehicle to travel within the at least one operational design domain.

In an alternative non-limiting embodiment of the invention, the method further comprises the step of calculating a degree of similarity between two or more operational design domains based at least in part on the determined driver-operated vehicle performance within the two or more operational design domains.

In an alternative non-limiting embodiment of the invention, the method further comprises the step of determining, based at least in part on the calculated degree of similarity, whether it is safer for the autonomous-operated vehicle or the driver-operated vehicle to travel within the two or more operational design domains.

In an alternative non-limiting embodiment of the invention, the method further comprises the steps of determining a risk associated with driving one or more specified routes within the at least one operational design domain, and directing the autonomous-operated vehicle or the driver-operated vehicle toward a lower risk route within the at least one operational design domain.

In an alternative non-limiting embodiment of the invention, data associated with the first and second conditions are obtained by at least one of a camera, a radar, a lidar, an infrared sensor, or an ultrasound detector.

In another non-limiting embodiment of the present invention, a system for evaluating safety performance of an autonomous vehicle is provided, comprising a first comparison device configured to compare first sensor data characterizing a driver-operation of a vehicle to a first threshold to obtain a first driving quality value, a second comparison device configured to compare second sensor data characterizing an autonomous-vehicle-operation to a second threshold to obtain a second driving quality value, and a determination device configured to determine, based at least in part on a comparing of the first and second driving quality values to each other, a safety performance of the autonomous-operated vehicle relative to the driver-operated vehicle.

In an alternative non-limiting embodiment of the invention, the device further comprises a calculation device configured to: calculate a degree of similarity between at least one first condition that is external to the driver-operated vehicle and at least one second condition that is external to the autonomous-operated vehicle determine that the degree of similarity exceeds a threshold, and compare the first and second driving quality values to each other based at least in part on the determination that the degree of similarity exceeds the threshold.

In an alternative non-limiting embodiment of the invention, the at least one first and second conditions include at least one of a weather condition, a lighting condition, a road condition, a road boundary condition, or an operational condition.

In an alternative non-limiting embodiment of the invention, the first and second thresholds are different.

In an alternative non-limiting embodiment of the invention, the device further comprises an operational design domain device configured to create at least one arbitrary operational design domain based on at least one condition that is external to the driver-operated vehicle, wherein a driver-operated vehicle performance is determined within the at least one operational design domain.

In an alternative non-limiting embodiment of the invention, an autonomous-operated vehicle performance is determined within the at least one operational design domain, wherein the driver-operated vehicle performance is compared to the autonomous-operated vehicle performance within the at least one operational design domain.

In an alternative non-limiting embodiment of the invention, a degree of similarity between two or more operational design domains is calculated based at least in part on the determined driver-operated vehicle performance within the two or more operational design domains.

In an alternative non-limiting embodiment of the invention, it is determined based at least in part on the calculated degree of similarity, whether it is safer for the autonomous-operated vehicle or the driver-operated vehicle to travel within the two or more operational design domains.

In an alternative non-limiting embodiment of the invention, it is determined based at least in part on the calculated degree of similarity, whether it is safer for the autonomous-operated vehicle or the driver-operated vehicle to travel within the two or more operational design domains.

In an alternative non-limiting embodiment of the invention, data associated with the first and second conditions are obtained by at least one of a camera, a radar, a lidar, an infrared sensor, or an ultrasound detector.

The present disclosure may be embodied in the form illustrated in the accompanying drawings. However, attention is called to the fact that the drawings are illustrative. Variations are contemplated as being part of the disclosure.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

Preferred embodiments of the invention will now be described with reference to the following drawings in which.

DETAILED DESCRIPTION OF PREFERRED EMBODIMENTS

Figure 1:
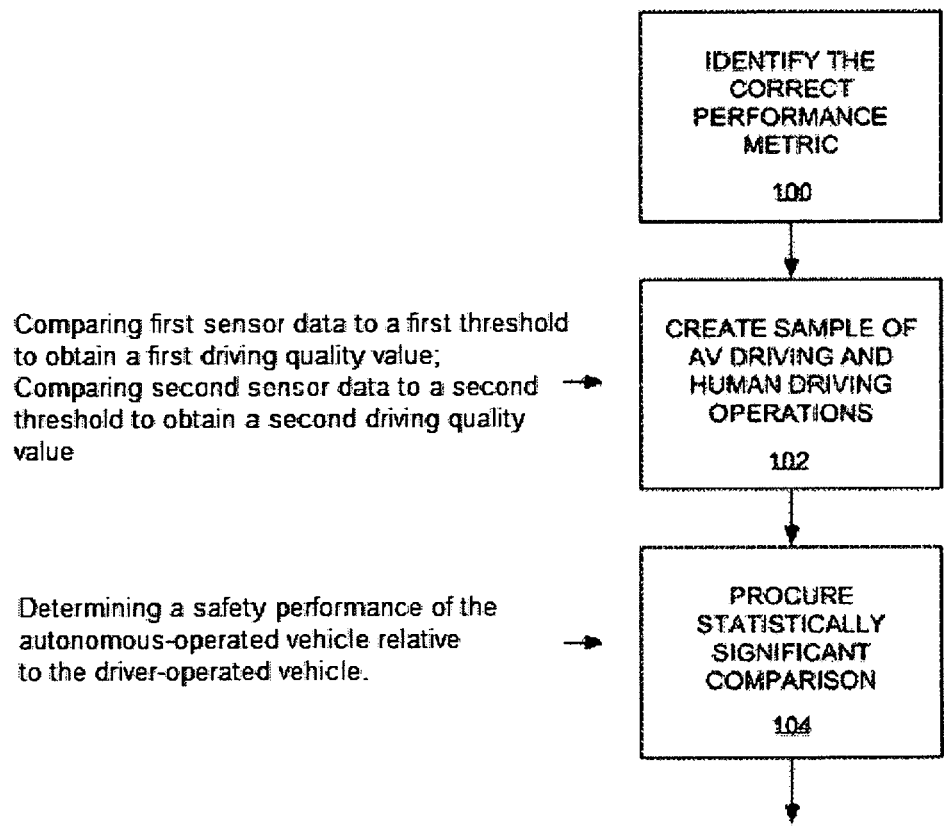
FIG. 1 is a flow chart of a method in accordance with a first embodiment of the invention.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner.

The terminology used herein can imply direct or indirect, full or partial, temporary or permanent, action or inaction. For example, when an element is referred to as being "on," "connected," "coupled" or "attached" to another element, then the element can be directly on, connected, coupled, or attached to the other element and/or intervening elements may be present, including indirect and/or direct variants. In contrast, when an element is referred to as being "directly connected" or "directly coupled" or "directly attached" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof. Further, alternate terminology should not be limited necessarily as exclusionary, but can be inclusionary as well.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

The methods of the present invention include the availability of one or more telematics devices in vehicles that can be installed to capture vehicle operational data and share it with a central data collection hub. The central data collection hub can collect similar or complementary information from other sensors and aggregate it. This can allow the comparison of the safety performance of the AV being evaluated with other human-driven vehicles.

For example, a telematics device can be plugged into the vehicle to capture data on vehicle acceleration, steering, and braking to look for patterns that are known to be predictive of risk.

Additionally, or alternatively, the procurement of vehicle operational data can be accomplished through a mobile device. The mobile device can capture, for example, acceleration, steering, braking, and other data points to capture incidents and patterns of driving which can lead to increased risk. The mobile device may also be able to sense additional safety related information, such as distracting cabin noise, other vehicles honking, driver engagement with mobile device, or other information.

Additionally, or alternatively, vehicle operational data can be procured directly from vehicle components or sensors with the capability to transmit data with non-local databases. The vehicles can be complemented with other sensors that observe road conditions and other vehicles (e.g. video cameras, radars, lidars, infrared sensors, and ultrasound detectors). These sensors can observe events or other metrics that can measure how safely a vehicle or an AV is driving.

According to an example embodiment, data can be aggregated from many drivers with telematic devices, mobile phones acting as telematic devices, and/or vehicle components which are connected. The data can be collected and analyzed in the central data hub. Additionally, information about human driver or AV performance can be extracted from a sensor or sensors which can either be mounted at a high vantage point or mounted on a helicopter, drone, or other aerial vehicle. The sensors can obtain a birds-eye view of a number of vehicles. Algorithms that can extract ranging and kinematic information from the vehicles (how fast they are going; their acceleration; the headway between vehicles at a given moment in time) can be applied to sensor data to extract events which are predictive of crash risk (e.g. hard accelerations or near-misses).

Turning to the figures, FIG. 1 is a flow chart illustrating an exemplary embodiment of a method for evaluating safety performance of an AV. The performance can be evaluated by comparing the driving performance of AVs to the performance of human drivers from real-time operating data.

The method can include, in a first step 100, identifying the correct performance metric or metrics that allow a comparison between human driving performance (e.g., "first sensor data") and AV performance (e.g., "second sensor data"). For example, the risk of individual drivers based on driving behaviors and performance metrics such as speeding, cornering, hard braking and acceleration, or other metrics are assessed. In addition, a risk assessment of AVs is performed by extending the analysis of human driving dynamics (e.g., "first driving quality threshold") but accounting for the reality that certain metrics are of lesser relevance to AVs (e.g., "second driving quality threshold"). For example, AVs will not engage in "distracted" driving and any propensity to speed may not be the same signifier of risk as when a human does. Metrics capturing information regarding AV safety performance are weighed to create an aggregate performance score to allow direct comparison with driver score reflecting the safety of human drivers. These metrics can overlap with the set of metrics that are used to gauge human performance, but can also include additional metrics that are specific to AVs.

Once the correct performance metrics are identified, in a second step 102, a sample can be created of both AV driving operation and human driving operation to make a meaningful comparison between the two. In a third step 104, data to allow a statistically significant comparison of human drivers with an AV is then procured. For example, if the human driving sample comes from driving in inclement weather in a complex urban environment (e.g., "first condition"), the method compares this to similar conditions of AV performance (e.g., "second condition"), and not, for example, to conditions such as sunny weather in a highway environment. In addition, to allow for the statistically significant comparison, AV performance in a localized geographic area is compared to a population of human drivers operating in the same geographical area is obtained, under similar road and ambient conditions as the AV, or under similar operational constraints, or some combination of these conditions, e.g., operational design domain ("ODD"). Accordingly, within an ODD, the performance of AVs can be examined by aggregating performance data for the AV. Any relevant occurrences can be logged and the frequency of incidents in the ODD as well as the driver score of the AV can be compared relative to the human driven benchmark in the ODD.

Figure 2:
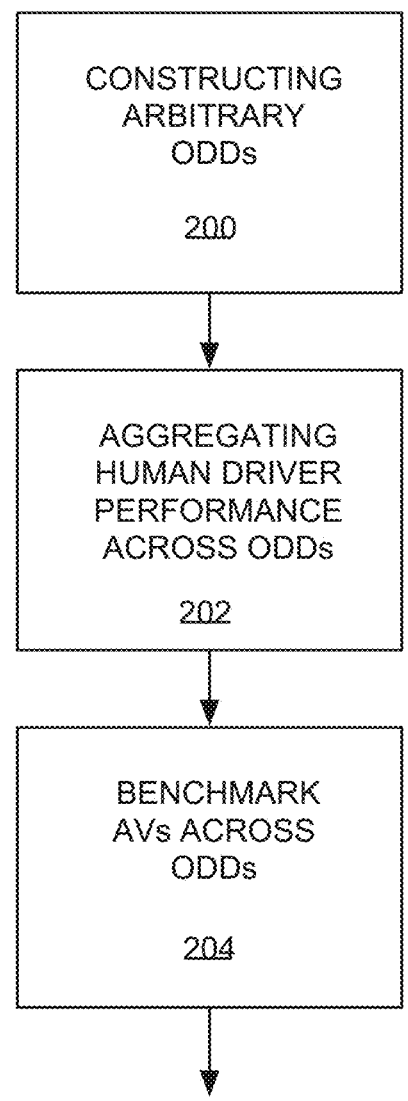
FIG. 2 is a flow chart of a method in accordance with a second embodiment of the invention.

According to an example embodiment as seen in FIG. 2, to allow for the statistically significant comparison, the method can include constructing arbitrary operational design domains 200 and aggregating human driver performance across the operational design domains 202. This can allow for the creation of a benchmark of human driving for a specified domain or collection of domains. This can be done, for example, by aggregating the frequency of events which may not be collisions, but are indicative of a propensity for collisions ("near-misses") or other metrics for assessing human driver performance across the domain. Then the AVs can be benchmarked across the operational design domain or set of conditions/geographies 204. To further improve the comparison, validation can take place for a specific set of roads, time of day, operational speed, weather conditions, or any combination thereof.

As a result of these comparisons, for example, AV developers can suggest a constrained operating design domain and benchmark the AV system within those limitations. In addition, the relative risk of each road segment for a given set of conditions can better be described, as captured by data from human drivers. This can be used, for example, to help inform insurance pricing, public safety improvement efforts, or direct AV deployment towards lower risk areas. It can also allow AVs to fulfill trips solely by operating in low-risk operating design domains in which AVs outperform their human counterparts by an appropriate margin. Additionally, performance standards can be specified for AVs such as being a certain percentage better than humans, and operational design domains that meet the specified criteria can be identified.

Specify routes can also be identified for use to fulfill a trip, for example, from point A to point B and beginning at a certain time, that are within ODDs that meet a specified safety benchmark, and/or the difference in timing it would take to fulfill the trip with different tolerances of safety performance and/or an AV or human driver who can operate without restrictions in ODD can be evaluated. The entire route can be scored based on the aggregate scores of the route segments, and each aggregate score relative to human drivers can be compared, allowing for improvement of evaluation of the tradeoff between safety and performance of an AV.

ODDs can be segmented by certain conditions, and a number of variables can be listed as key variables for constructing ODDs, and for each metric or reading of sensor readouts, it can be accompanied by values for ODD fields. For example, key variables for constructing ODDs can include: road type (including surface, edge, and geometric constructions), environmental conditions (weather, weather-induced road conditions, and lighting), operational constraints (speed constraints and traffic density), the variety of objects in the path (traffic signs, other road actors, or other non-roadway objects), or special zones (a particular geofence, construction, toll plaza, school zones, tunnels or tall buildings). Moreover, ODDs can be constructed by combining variables for determining ODD into distinct sets. For example, if the "road type" field can be filled by one of ten different descriptors and the "weather condition" field can be filled by one of ten different descriptors, then there are potentially 100 ODDs based on these two descriptors alones. With the ODD described by several descriptors, there can be an enormous number of distinct ODDs.

According to an example embodiment, a method for calculating the similarity of ODDs to each other is performed. This can be done, for example, by assigning the different potential values for each descriptor a "proximity value" to the others. For example, the "road type" variables can include entries such as "urban road", "rural road", and "non-Interstate highway". The proximity relationship can determine that "rural roads" represent an ODD that is more similar to "non-Interstate highways" than it is to "urban roadways". This information can contribute to the joint evaluation of similar ODDs, allowing the construction of a smaller number of composite ODDs. Accordingly, AV developers, for example, whose product has been validated in a particular ODD or set of ODDs can determine what other ODDs are proximate to the validated ODD. This can inform further development or deployment decisions as safety validation can be easiest for ODDs proximate to ones which have already been validated. This can also allow, for example, developers to tune a parameter or parameters that link ODDs based on their similarity. If developers choose a stringent parameter, for example, only ODDs that were highly similar can show as linked. With a looser parameter a broader range of ODDs can be considered similar to each other. Also, it can be estimated what fraction of trips are traveled within a certain ODD. This can allow, for example, developers to prioritize the development of AVs both by similarity to ODDs that have already been validated, but also by how significant ODDs are. For example, it can be more valuable to develop and validate AVs for ODDs that contain greater demand for travel.

Figure 3:
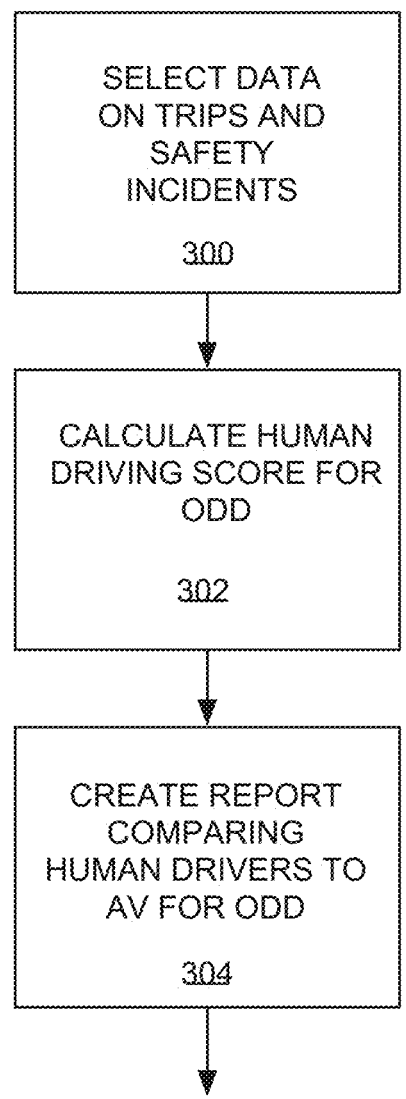
FIG. 3 is a flow chart of a method in accordance with a third embodiment of the invention.

Human safety performance can be aggregated for an ODD or set of ODDs desired, for example, by the developer. As shown in FIG. 3, From the database collected by the central data hub, data on trips and safety incidents occurring in the ODD or set of ODDs can be selected 300. The human driving score for this ODD can be calculated 302. Then, a detailed report comparing human drivers and the AV for an ODD or selected ODDs can be created 304, which can demonstrate the relative strengths of AVs to human drivers and where AVs overperform or underperform metrics relative to human drivers.

Two distinct measures of assessing the risk of a particular journey can be utilized. One is a baseline of how risky each potential trip journey is to human drivers based on the aggregated driver score summed for the ODD in each route segment. The second measure of risk is the relative risk of an AV driving a particular route compared to a human driving that route. This can be calculated using the relative safety performance of the AV in question to a human driver for each ODD encountered across the entire route. The safest route for an AV to take can also be determined, both in terms of its performance relative to a human driver, and the risk of the road as it is presented to human drivers. The journey time can also be specified. This can allow, for example, transportation operators the ability to make a decision-based on how they want to balance journey time, overall safety, and AV safety relative to a human driver.

Different AV designs can have different safety performances for the same ODD. For a particular route, one AV can perform better. The quantification of the safety of each AV on a particular combination of route segment and operating conditions can be performed. Accordingly, transportation operators with multiple AVs designs with different safety performances can dispatch one of the AVs based on its performance over the needed route. For example, one AV design can be able to take a more direct route because it can perform better on the needed route, while another design can have the best overall safety rating for a given route. Transportation operators can also quantify for a given ride request: a) how close various AVs are to the ride origination point, b) which AVs can serve the route mostly safely and time-efficiently, and c) if alternative routes exist for which at least one AV can more safely travel than the most direct route. This information can be presented to the transportation provider so it can make a decision as to which option it wishes to execute.

The method further can include identification of patterns in vehicle operational data that correlate with greater risk of an accident ("near-misses" or "risky driving events") or are indicative of the overall safety performance of the driver. Examples include events of high acceleration or deceleration, excessive lateral motion, excessive speed, or unreasonably close approach to another vehicle, a pedestrian, or another road actor. The data associated with these events can come from telematic devices plugged into vehicles, mobile devices contained in the vehicle, visual evidence from videos of the road, data from other sensors, or other sources.

A hard braking event can be detected, for example, from direct speed reading from devices or from measuring the change in position between measurements divided by the change in speed over time. A hard braking event is when the acceleration exceeds a certain threshold. A threshold can be set at about 4.9 meters per second squared. However, it will be appreciated that other threshold are possible and are within the scope of the present invention. Hard accelerating events can be detected using similar methods, with a threshold usually set somewhat below the value for hard braking.

Cornering can occur when a vehicle turns at an unsafe rate of speed. It can be determined by calculating the centripetal force on the vehicle from the radius of the turn and the speed at which is takes place using the formula acceleration=$v^2/r$ where v is the speed at which the turn is taken and r is the radius of the turn. Safe cornering acceleration differs from vehicle to vehicle, but an initial suggested value for flagging a cornering event as unsafe is 4 meters per second squared.

However, it will be appreciated that other suggested values are possible and are within the scope of the present invention.

Excessive lateral motion while driving can be defined by the distance the vehicle moves in the direction perpendicular to travel. It can be measured by the cumulative distance traveled in a lateral direction over a period of time.

The thresholds of these events can be adjusted. Adjustments can be made separately for each type of event captured. The thresholds can apply to events that occur when measuring the performance of human drivers in a given ODD as well as to the AV whose performance is being benchmarked.

A "close approach" can occur when a vehicle approaches either another vehicle, a pedestrian, other road actor, or a fixed object. A "close approach" can be determined by utilizing data from a sensor such as a video camera, lidar, radar, infrared sensor or other device, or by using the known location of other traffic participants from other data sources such as a mobile or telematics device belonging to the other traffic participant.

A certain frequency of "near contacts" can be expected, but if the rate of "near contacts" is lower for AVs than for human-driven vehicles that can be indicative that AVs are driving safer and more conservatively than human drivers in a given domain.

The rate of "close approaches" can be highly correlated with the vehicular, pedestrian, and other traffic density of the ODD being examined. Denser ODDs can have higher rates of "close approaches" while areas with lighter traffic tend to have lower rates. Any comparison of "close approach" rate can account for traffic density or "level of service."

A "close approach" event can occur when the physical distance between the AV or human-driven car falls below a certain threshold. The event ends when the physical distance rises above the threshold. The threshold can be "tuned" for each evaluation and parameters of the ODD or ODDs being examined. The threshold can be defined differently for vehicles, pedestrians, bicyclists, or other road actors. It can also be set to different values The distance used to define the "close approach" threshold can be measured laterally, longitudinally, or by total distance. It can also be speed dependent. It can be highly sensitive to the traffic density and speed of travel.

Another parameter than can be used to compare the safety of AVs and human drivers is the frequency of honking by surrounding vehicles. The frequency of honking by surrounding vehicles is an indicator of a violation of the norms of driving. The frequency of honking in the vicinity of an AV can be compared to the frequency of honking in the vicinity of human driven vehicles for a given ODD or set of ODDs. The frequency of honking can be determined by either audio sensors of vehicles or data directly from vehicles which send operational data to a central database.

Data collected from the methodologies outlined above can be used to create an "instantaneous risk metric" that can use information about the location of a vehicle, its speed, as well as the position and speed of other vehicles and roadway actors, to create a formal definition of whether a vehicle is driving safely. Once the position and movements of road actors are determined, it is possible to define a "safety envelope" for actions that represent safe driving actions. Information about vehicle speeds and location can be acquired to determine whether a vehicle is travelling within the "safety envelope" defined by others. Additionally, it can be measured how often a safety envelope is violated, both by an AV or by human drivers. The relative rates of the violation of the safety envelope can be used to benchmark an AV against a human driver.

The method can further include use of an instantaneous risk metric (IRM) that can take on a continuum of values (as opposed to the binary values of "within the safety envelope" and "in violation of the safety envelope") which can represent an assessment of risk of a collision based on the positioning and motion of the vehicle and all roadway actors. The instantaneous risk metric can be assessed continuously, and the safety of an AV or human driver can be determined by integrating the IRM over the period of evaluation. For a vehicle that is observed from $t_i$ to $t_f$, and for an IRM that is measured at an arbitrary time t as IRM(t), the safety performance of a given vehicle can be given by $$\frac{\int_{t_i}^{t_f} IRM(t)}{t_f - t_i} dt$$

AV developers and other interested parties can evaluate the similarity of different ODDs to focus development efforts or understand the challenges in expanding AV operational capabilities to another ODD.

An ODD can be described by a particular value for relevant elements (e.g. weather, road type, time of day, traffic density, etc.). An ODD with n elements can be represented as a n-vector or $$ODD = \vec{E},$$

where $\vec{E}$ has n elements, each representing the particular value of that ODD element. The ith element is denoted by $$ODD_i = \vec{E}_i$$

For example, an ODD can have three elements (time of day, weather, and road type), and each element can have three potential values (1,2,3). These can correspond to the elements as follows: time of day: day, night, twilight; weather: Sunny, rainy, snowy; road type: highway, urban road, rural road. In this case, the ODD vector $$ODD = \vec{E} = \begin{bmatrix} 2 \\ 1 \\ 3 \end{bmatrix}$$

can correspond to an ODD of nighttime travel, with no precipitation, on a rural road. However, it will be appreciated that ODD's can have considerably more than three elements and each element can have considerably more than three potential values.

To be able to compare arbitrary ODDs for similarity, one approach is to define a function S that takes as input two ODD descriptions, $\vec{E}$ and $\vec{E}'$, and outputs a number expressing the difference in human driving performance based on any of the metrics or procedures described above.

$$S(\vec{E}, \vec{E}') = k,$$

Where k represents a number between 0 and 1. A difference of 0 can reflect that human drivers perform at the identical level of safety in both ODDs ($\vec{E}$ and $\vec{E}'$). A difference of 1 can occur when $\vec{E}'$ is the safest ODD and $\vec{E}$ is the most dangerous. The distribution of the set of ODD safety levels can either be set to be linear between 0 and 1, or represent a statistical distribution (for example, a standard deviation centered at 0.5). The function S can evaluate the safety of human drivers in a given ODD either holistically (by the combination of many metrics) or simultaneously using several different metrics, which can allow a more nuanced comparison between human performance between ODDs.

A second approach for quantifying the difference between ODDs can be to take a stepwise approach in evaluating differences ODDs. This procedure is described as follows:

Without loss of generality, each element $\vec{E}_i$ can have m different values $(\vec{E}_i)_j$, corresponding to values of j from 1 to m. The similarity of potential values $(\vec{E}_i)_j$ and $(\vec{E}_i)_k$ is determined by the function $$\vec{E} = \begin{bmatrix} 3 \\ 2 \\ 5 \end{bmatrix} \text{ and } \vec{E}' = \begin{bmatrix} 1 \\ 6 \\ 8 \end{bmatrix},$$

and is output in the tensor $S_{ijk}$. In other words, the tensor element $S_{ijk}$ represents the similarity of the jth and kth potential value for ODD element $\vec{E}_i$. For two ODDs, $\vec{E}$ and $\vec{E}'$, they can differ in several elements. For example, if the two ODD elements are given by $$S([\vec{E}_i]_j, [\vec{E}_i]_k) \overset{def}{=} S_{ijk},$$

then several elements of $S_{ijk}$ can be used to compare the difference between ODDs by changing one element at a time. The key elements to allow the comparison of $\vec{E}$ and $\vec{E}'$, can be $S_{131}$ (representing a comparison between the $3^{rd}$ and $1^{st}$ value of the first ODD element), $S_{226}$ (representing a comparison between the $2^{nd}$ and $6^{th}$ value of the second ODD element), and $S_{358}$ (representing a comparison between the $5^{th}$ and $8^{th}$ value of the third ODD element). This can be generalized to a comparison with an ODD of arbitrary number of elements and arbitrary number of values for each element. In this example, the values $S_{131}$, $S_{226}$, and $S_{358}$ can be either added linearly to determine the difference between the ODDs $\vec{E}$ and $\vec{E}'$, or they can be combined using a function that takes in each of those components and outputs a single value determining the difference between the two ODDs.

To complete the approach, a method for determining the value of $S_{ijk}$ for any given value of i, j and k is needed. Those can be determined by actually observing the difference in human safety performance for each step-change in ODD (for example, the element $S_{131}$ can represent the difference in human safety driving when changing the $1^{st}$ element of the ODD from value 3 to value 1 (in the example above, this can correspond to the change in safety performance when moving from twilight to daytime, holding other conditions constant). This can be calculated using data collected on human safety performance across ODDs and aggregating all samples collected in daytime and in twilight (so it can average across all other ODDs).

Transportation system managers, for example, can dispatch either a human vehicle or one of several autonomous vehicles depending on the tradeoffs in both operational performance and safety on potential routes. To do so, the safety of a given route for both AVs and human drivers can be measured. For a given route R, the safety performance of that route can be described by $$P_H(R) = \Sigma_i P_H(R_i) * R_i,$$

where the route R is broken up into small enough segments $R_i$, such that each $R_i$ is only in a single ODD and that the route can be considered the sum of all $R_i$ segments. The function $P_H(R_i)$ assesses the human safety performance of the ODD that the route segment is projected to be in at the time of travel, using one of the metrics or methodologies presented. The sum weights the human safety performance of each route segment according to the length of each segment.

The safety of a given autonomous vehicle A on a route R is described by $$P_A(R) = \Sigma_i P_A(R_i) * R_i,$$

where the function $P_A(R_i)$ assesses the AV safety performance of the ODD that the route segment is projected to be in at the time of travel.

A transportation provider can decide whether to dispatch an AV to a customer desiring a trip from a particular origin and destination should have an autonomous vehicle dispatched to fulfill the ride. If the most direct route for the fulfillment of the trip is route R, the AV can only be dispatched if the safety of the autonomous vehicle exceeds that of a human driver by a specified margin, where k is a value greater than 1:

$$P_A(R) > k * P_H(R).$$

Additionally, multiple routes can be considered, each with different safety performances for both humans and autonomous vehicles. There can be n potential routes between the origin and destination, denoted by $R^1, R^2, \ldots, R^n$. An autonomous vehicle can be dispatched if the safety performance on at least one route is greater than the human safety performance on its best route, which can be described as $$\text{Max}[P_A(R^1), P_A(R^2), \ldots, P_A(R^n)] > k * \text{Max}[P_H(R^1), P_H(R^2), \ldots, P_H(R^n)].$$

The dispatcher can weigh the operational characteristics of each route (time to complete and other considerations).

Moreover, if the dispatcher has multiple autonomous vehicles, each of which can have a differing safety performance in each ODD, the dispatcher can determine which AV is most appropriate for the given situation. In a set of n autonomous vehicles, for the same route R, the safety performance of vehicle i (each value of i corresponding to one of the n vehicles) can be given by $P_A^i(R)$.

Transportation dispatchers can also choose which vehicles to dispatch for which routes. For a set of N autonomous vehicles and M routes, a matrix can be created which represents the safety performance of each vehicle on each potential route. The matrix can be defined as follows $$P = \begin{bmatrix} P_A^1(R^1) & \cdots & P_A^1(R^M) \\ \vdots & \ddots & \vdots \\ P_A^1(R^N) & \cdots & P_A^N(R^M) \end{bmatrix}$$

Where $P_{ij}$ represents the safety performance of the autonomous vehicle i on the route j. Construction of this matrix can allow dispatchers to appropriately match which autonomous vehicle is best suited for each route. Dispatchers can balance the safety performance of a particular autonomous vehicle on a specific route with the cost and time involved in matching the autonomous vehicle to a particular trip. The matrix can also be used in a decision whether to dispatch a human driver instead of an autonomous vehicle because the human driver can perform better on some routes, or can be better positioned to fulfill the route. For a transportation network company allowing multiple autonomous vehicles and human drivers on their platform, this can allow dispatchers to better assess the tradeoffs in matching human drivers and specific AVs to different customers requesting disparate trips based on safety performance information.

An example embodiment of the present invention is directed to one or more hardware computer-readable media, having stored thereon instructions executable by a processor to perform the methods described herein (e.g., comparison device, determination device, calculation device). For example, an example embodiment of the present invention is directed to a computer system. The computer system can include at least one processor which can be configured to display a graphical user interface (GUI) that includes a graphical representation of, for example, the sensed data and conditions.

An example embodiment of the present invention is directed to a method, e.g., of a hardware component or machine, of transmitting instructions executable by a processor to perform the methods described herein.

An example embodiment of the present invention is directed to a computer, a video, an electronic device, and/or any other electronic platform on which the evaluation is possible. One or more processors, which can be implemented using any conventional processing circuit and device or combination thereof, e.g., a Central Processing Unit (CPU) of a Personal Computer (PC) or other workstation processor, execute code provided, e.g., on a hardware computer-readable medium including any conventional memory device, to perform any of the methods described above, alone or in combination. The one or more processors can be embodied in a server or user terminal or combination thereof. The user terminal can be embodied, for example, a desktop, laptop, hand-held device, Personal Digital Assistant (PDA), television set-top Internet appliance, mobile telephone, smart phone, electronic game consoles etc., or as a combination of one or more thereof. The computer, video, etc. can be combined with other physical elements, and can involve interaction by a user or a plurality of users with a user interface to generate visual and/or audio feedback on a video and/or audio device. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. Such devices can be used to perform the method described above.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification.

Accordingly, while the present invention has been disclosed in connection with the above non-limiting embodiments, it should be understood that other embodiments can fall within the spirit and scope of the invention, as defined by the following claims.

What is claimed is:

1. A method for evaluating safety performance of an autonomous vehicle, the method comprising:
   creating, by at least one processor, at least one arbitrary operational design domain based on at least one condition that is external to a driver-operated vehicle;
   controlling, by the at least one processor, an autonomous-operated vehicle to perform a first maneuver by an autonomous-vehicle-operation within the at least one operational design domain;
   controlling, by the at least one processor, at least one first sensor to sense first sensor data characterizing the autonomous-vehicle-operation while the autonomous-operated vehicle is being controlled to perform the autonomous-vehicle-operation within the at least one operational design domain;
   determining, bye the at least one processor, an autonomous-operated vehicle performance within the at least one operational design domain by comparing the first sensor data, obtained by the at least one first sensor sensing the first sensor data, to a first threshold to obtain a first driving quality value;
   determining, by the at least one processor, a driver-operated vehicle performance within the at least one operational design domain by comparing second sensor data characterizing a driver-operation of the driver-operated vehicle to perform a second maneuver within the at least one operational design domain to a second threshold to obtain a second driving quality value, wherein the second sensor data is obtained by at least one second sensor;
   performing a comparison, by the at least one processor, of the driver-operated vehicle performance to the autonomous-operated vehicle performance within the at least one operational design domain based on a similarity of at least one of environmental, a time of day, and road conditions when the first maneuver and the second maneuver were performed, wherein the at least one processor is configured to perform the comparison even when the first maneuver and the second maneuver are different; and
   determining, by the at least one processor, based at least in part on the comparison of the driver-operated vehicle performance to the autonomous-operated vehicle performance within the at least one operational design domain, a safety performance of the autonomous-operated vehicle relative to the driver-operated vehicle.

2. The method of claim 1, further comprising:
   prior to determining the safety performance:
      calculating a degree of similarity between at least one first condition that is external to the driver-operated vehicle and at least one second condition that is external to the autonomous-operated vehicle;
      determining that the degree of similarity exceeds a threshold; and
      comparing the first driving quality value to the second driving quality value based at least in part on the determination that the degree of similarity exceeds the threshold.

3. The method of claim 2, wherein the at least one first condition and the at least one second condition include at least one of a weather condition, a lighting condition, a road condition, a road boundary condition, or an operational condition.

4. The method of claim 1, where in the first threshold and the second threshold are different.

5. The method of claim 1, further comprising:
   determining, based at least in part on the comparing, whether it is safer for the autonomous-operated vehicle or the driver-operated vehicle to travel within the at least one operational design domain.

6. The method of claim 5, further comprising:
   calculating a degree of similarity between two or more operational design domains based at least in part on the determined driver-operated vehicle performance within the two or more operational design domains.

7. The method of claim 6, further comprising:
   determining, based at least in part on the calculated degree of similarity, whether it is safer for the autonomous-operated vehicle or the driver-operated vehicle to travel within the two or more operational design domains.

8. The method of claim 1, further comprising:
determining, a risk associated with driving one or more specified routes within the at least one operational design domain; and
directing the autonomous-operated vehicle or the driver-operated vehicle toward a lower risk route within the at least one operational design domain.

9. The method of claim 1, wherein data associated with the at least one first condition and the at least one second condition are obtained by at least one of a camera, a radar, a lidar, infrared sensor, or an ultrasound detector.

10. A system for evaluating safety performance of an autonomous vehicle, the system comprising:
at least one processor, wherein the at least one processor is programmed to:
create at least one arbitrary operational design domain based on at least one condition that is external to a driver-operated vehicle;
control an autonomous-operated vehicle to perform a first maneuver by an autonomous-vehicle-operation within the at least one operational design domain;
control at least one first sensor to sense first sensor data characterizing the autonomous-vehicle-operation while the autonomous-operated vehicle is being controlled to perform the autonomous-vehicle-operation within the at least one operational design domain;
determine, by the at least one processor, an autonomous-operated vehicle performance within the at least one operational design domain by comparing the first sensor data, obtained by the at least one first sensor sensing the first sensor data, to a first threshold to obtain a first driving quality value;
determine a driver-operated vehicle performance within the at least one operational design domain by comparing second sensor data characterizing a driver-operation of the driver-operated vehicle to perform a second maneuver within the at least one operational design domain to a second threshold to obtain a second driving quality value, wherein the second sensor data is obtained by at least one second sensor,
compare, by the at least one processor, the driver-operated vehicle performance to the autonomous-operated vehicle performance within the at least one operational design domain based on a similarity of at least one of environmental, a time of day, and road conditions when the first maneuver and the second maneuver were performed, wherein the at least one processor is configured to perform the comparison even when the first maneuver and the second maneuver are different; and
determine, based at least in part on the comparing of the driver-operated vehicle performance to the autonomous-operated vehicle performance within the at least one operational design domain, a safety performance of the autonomous-operated vehicle relative to the driver-operated vehicle.

11. The system of claim 10, wherein the at least one processor is further programmed to:
calculate a degree of similarity between at least one first condition that is external to the driver-operated vehicle and at least one second condition that is external to the autonomous-operated vehicle;
determine that the degree of similarity exceeds a threshold; and
compare the first driving quality value to the second driving quality value based at least in part on the determination that the degree of similarity exceeds the threshold.

12. The system of claim 11, wherein the at least one first condition and the at least one second condition include at least one of a weather condition, a lighting condition, a road condition, a road boundary condition, or an operational condition.

13. The system of claim 10, wherein the first threshold and the second threshold are different.

14. The system of claim 10, wherein a degree of similarity between two or more operational design domains is calculated based at least in part on the determined driver-operated vehicle performance within the two or more operational design domains.

15. The system of claim 14, wherein it is determined based at least in part on the calculated degree of similarity, whether it is safer for the autonomous-operated vehicle or the driver-operated vehicle to travel within the two or more operational design domains.

16. The system of claim 10, wherein a risk associated with driving one or more specified routes within the at least one operational design domain is determined, and the autonomous-operated vehicle or the driver-operated vehicle is directed toward a lower risk route within the at least one operational design domain.

17. The system of claim 10, wherein data associated with the at least one first condition and the at least one second condition are obtained by at least one of a camera, a radar, a lidar, infrared or an ultrasound detector.

18. The method of claim 1, wherein at least one of the first driving quality value or the second driving quality value is a discrete variable.

* * * * *